United States Patent [19]

Hashimoto

[11] Patent Number: 5,521,975
[45] Date of Patent: May 28, 1996

[54] TELEPHONE TERMINAL DEVICE WITH MEANS FOR DETECTING ABANDONMENT OF CALL

[75] Inventor: Kazuo Hashimoto, Tokyo, Japan

[73] Assignee: Hashimoto Corporation, Tokyo, Japan

[21] Appl. No.: 288,760

[22] Filed: Aug. 11, 1994

[30] Foreign Application Priority Data

Aug. 13, 1993 [JP] Japan ................................. 5-222109

[51] Int. Cl.⁶ .................................................. H04M 1/64
[52] U.S. Cl. ......................... 379/382; 379/373; 379/377; 379/379; 379/252; 379/70; 379/79; 379/256
[58] Field of Search .............................. 379/373, 70, 79, 379/253, 284, 252, 256, 382, 379, 377, 233, 237

[56] References Cited

U.S. PATENT DOCUMENTS

| 4,079,210 | 3/1978 | Sanderson | 379/382 |
|---|---|---|---|
| 4,679,229 | 7/1987 | Yamaguchi | 379/373 |
| 4,914,690 | 4/1990 | Hagedorn | 379/237 |
| 4,975,940 | 12/1990 | Hashimoto | 379/67 |
| 5,063,589 | 11/1991 | Tsushima | 379/70 |
| 5,119,418 | 6/1992 | Dupillier | 379/373 |
| 5,159,626 | 10/1992 | Baum et al. | 379/79 |
| 5,293,420 | 3/1994 | Nagato | 379/382 |
| 5,329,584 | 7/1994 | Nagato | 379/382 |
| 5,402,482 | 3/1995 | Minohara et al. | 379/382 |
| 5,406,623 | 4/1995 | Rovik | 379/382 |

FOREIGN PATENT DOCUMENTS

| 1107913 | 11/1981 | Japan | H04M 1/64 |
|---|---|---|---|
| 2271244 | 4/1994 | United Kingdom | H04M 1/60 |
| 2160390 | 12/1995 | United Kingdom | H04Q 7/04 |

Primary Examiner—Jeffery Hofsass
Assistant Examiner—Scott Wolinsky
Attorney, Agent, or Firm—Lowe, Price, LeBlanc & Becker

[57] ABSTRACT

A telephone terminal device, which is activated by a predetermined number of ringing signals even if a telephone call occurred immediately after a previous caller had abandoned a call before engagement of the telephone line. When the telephone terminal device is set to standby mode, the polarity of telephone line (L1, L2) is stored in microprocessor CPU-1 via photocoupler PC-3 (or PC-4) and contact y2-1. If there is a call thereafter, ringing portion of the ringing signal is detected by photocoupler PC-3 (or PC-4) via capacitor C2. During a silent period, the polarity of the telephone line (L1, L2) is checked by the aforementioned PC-3 or PC-4 via contact y2-1 which is closed. When the polarity of the telephone line at the time of abandonment of call by a caller prior to activation of the telephone terminal device coincides with the aforementioned polarity stored, the telephone terminal device is restored to standby mode (with the counter for ranging signals being cleared).

10 Claims, 3 Drawing Sheets

5,521,975

TELEPHONE TERMINAL DEVICE WITH MEANS FOR DETECTING ABANDONMENT OF CALL

BACKGROUND OF THE INVENTION

The present invention is an improvement of Japanese Patent No. 1107913 (Number of Examined Application Published: S56-4951) invented by the same applicant, and relates to processing in a telephone terminal device which takes place when a caller hangs up before the device is activated.

For example, the telephone terminal device which was disclosed in the above-mentioned Japanese patent occasionally would not be activated after a predetermined number of ringing signals. The latter arose due to an unstable state of the telephone line resulting from abandonment of a call before engagement of the telephone line, which caused a malfunction of the so-called "toll saver" function. It may be recalled that with the toll saver function, if no messages have been recorded on the device, it is activated after four rings. If at least one message has been recorded, it is activated after two rings.

Even though the probability of such a malfunction is low, it can not be ignored. Therefore, the present invention is designed to prevent such a malfunction from ever occurring. Specifically, the present invention is directed to provide a means for activating a telephone terminal device in response to a predetermined number of ringing signals even if a new ringing signal arrives immediately after a previous call that was abandoned during ringing.

SUMMARY OF THE INVENTION

Unlike conventional devices which determine whether a call was abandoned before engagement of the telephone line by detecting discontinuation of ringing signals, the present invention achieves its objective not only by detecting such a discontinuation but also by detecting a change in voltage on the telephone line.

In the present invention, polarity of telephone line (DC voltage) during standby mode of a telephone terminal device is stored in a memory means. If the polarity of the telephone line after the voltage change resulting from caller's abandonment of call matches the polarity which was memorized, the call will be judged to have been abandoned.

Legend

1=CPU 2, 3, 4, 5=Inverters

6=Line transformer

Y-1, Y-2=Relays

PC-1, PC-2, PC-3, PC-4=Photocouplers

L-1, L-2=Telephone line

DESCRIPTION OF THE PREFERRED EMBODIMENT

Figure 1:
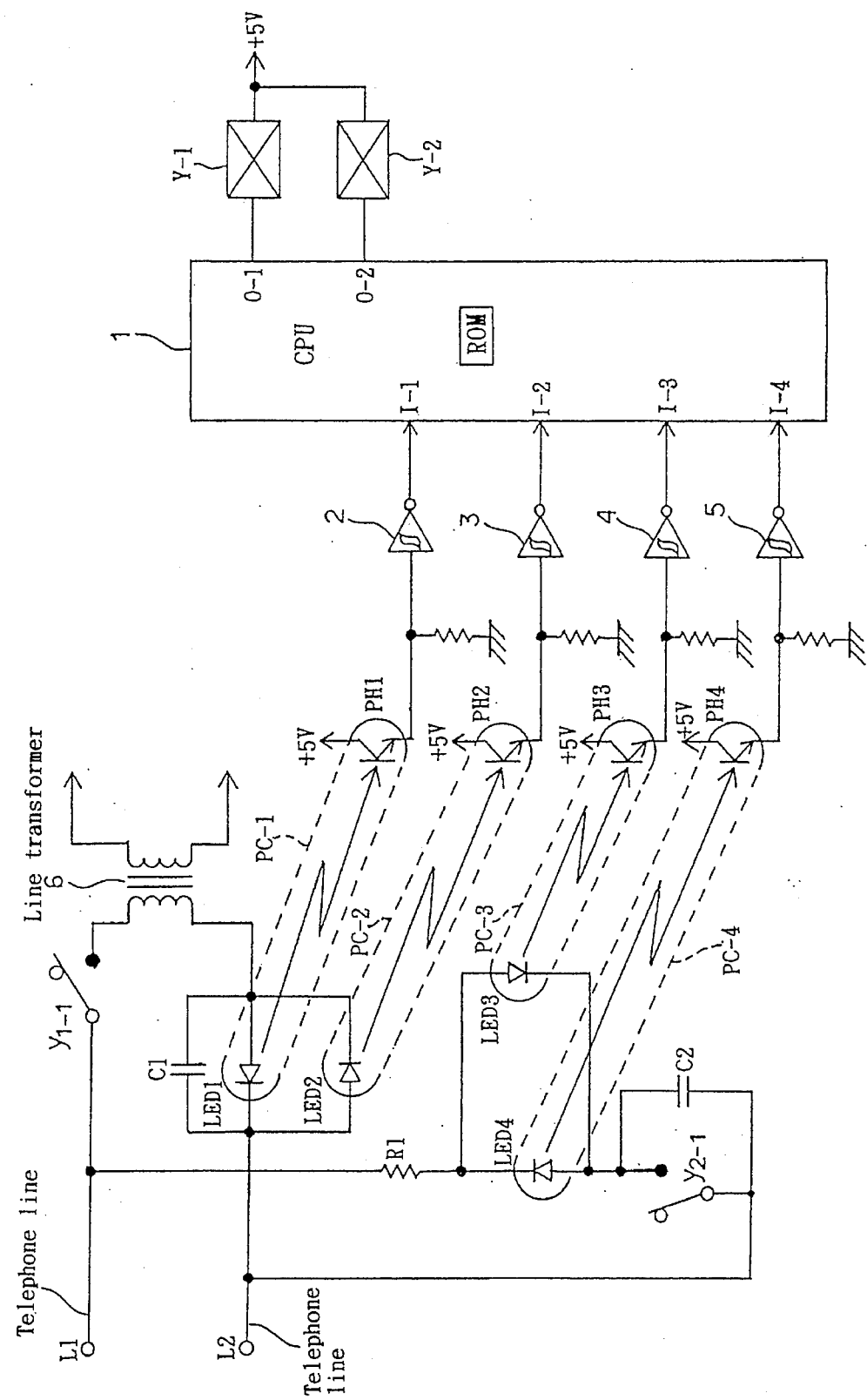
FIG. 1 is a circuit diagram illustrating one embodiment of the present invention.

The following is an explanation of the structure and operation of the present invention. FIG. 1 illustrates the main components of the present invention. In this figure, numeral 1 represents a microprocessor (CPU). The program which controls the present device is stored in a ROM.

Numerals 2 through 5 represent Schmitt-type inverters. Numeral 6 is a line transformer. Symbols PC-1 through PC-4 are photocouplers. Symbols Y-1 and Y-2 are relays having contacts y1-1 and y2-1, respectively. Symbol L1 is the positive terminal of a telephone line and L2 is the negative terminal. There can be two loops between L1 and L2. A first loop can be formed by the "make" contact y1-1, the primary winding of line transformer 6, and the parallel circuits of LED-1 and LED-2 in the LED section of the respective photocouplers PC-1 and PC-2. A second loop can be formed by resistor R1, the parallel circuits of LED-3 and LED-4 in the LED section of the respective photocouplers PC-3 and PC-4, the "make" contact y2-1 and the parallel circuit of C-2.

Figure 2:
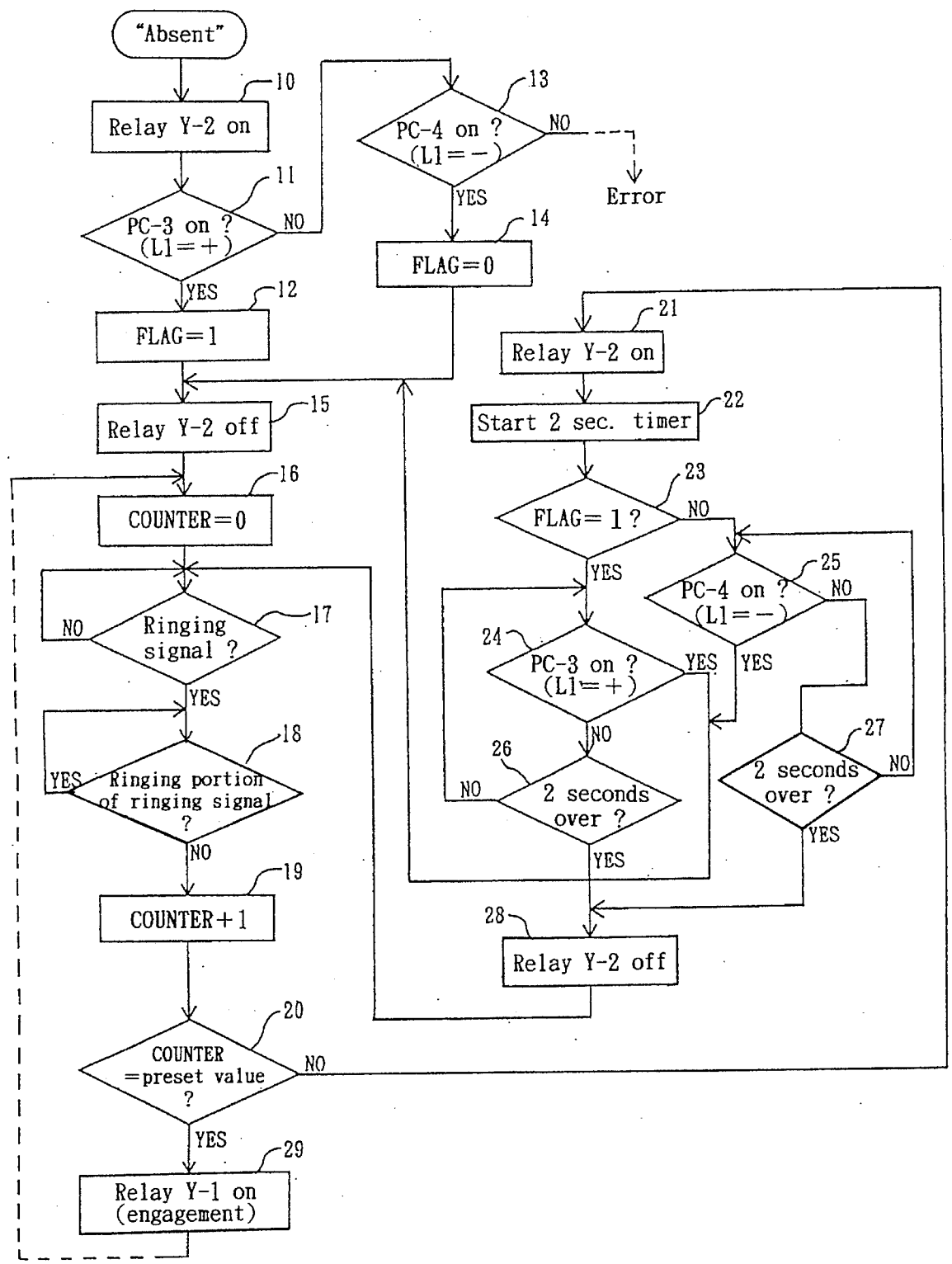
FIG. 2 is a flowchart illustrating sequence of operations of the present invention.

Next is a description of the operation of the present invention. The subroutine shown in FIG. 2 is invoked when the "Absent" button (not shown in the drawings) is pressed. At Step 10, output port 0-2 drops to a low ("L") level by means of a command from the microprocessor, thereby turning loaded relay Y-2 on.

Accordingly, contact y2-1 closes, and the telephone line (L1, L2) is connected to photocoupler PC-3 and PC-4 via resistor R1, which has a high resistance value, so that direct current can flow to either PC-3 or PC-4. At this time, if the polarity of L1 is positive and L2 is negative, LED-3 of photocoupler PC-3 will turn on and the resulting light will be received by phototransistor PH3. (Henceforth, the latter will be referred to as "PC-3 on.") Then, input port I-3 drops from a high ("H") level to a low ("L") level by means of inverter 4.

When PC-3 turns on and input port I-3 drops to a low ("L") level, Step 11 will become affirmative. At the next Step 12, FLAG is set to "1" and polarity of the telephone line is stored in memory.

On the other hand, if the telephone line is of the opposite polarity, the program branches to Steps 13 and 14 wherein FLAG is set to "0." Regardless of the polarity of the telephone line, relay Y-2 turns off in response to the command at Step 15. At Step 16, a counter for counting the number of ringing signals is cleared. At Step 17, standby mode, wherein the device awaits arrival of a ringing signal, is activated. It may be Observed that the above memorization of the polarity of the telephone line should take place before the arrival of ringing signals, perhaps when the device is turned on.

Figure 3:
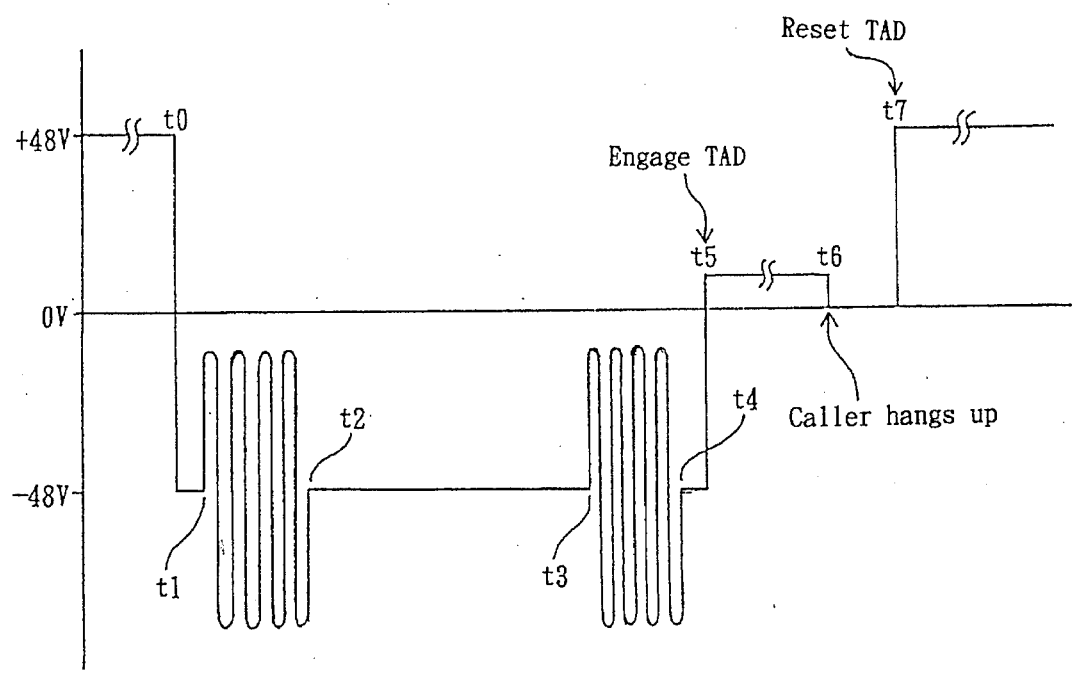
FIG. 3 is a timing chart for the telephone terminal device illustrating its activation in response to ringing signals and restoration.

When ringing signals arrive during standby mode, photocouplers PC-3 and, PC-4 turn on and off repeatedly. By checking the period of the ringing signal, it is possible to confirm that it is indeed a ringing signal. If the signal is a ringing signal, Step 17 will be affirmative. After the ringing portion of the ringing signal has ended and the silent portion of the ringing signal (see t2 of FIG. 3) begins, Step 18 will be negative. Then the counter is incremented by 1 at Step 19.

The present device counts the number of ringing signals. The user has the option of selecting the number of rings after which the device will be activated. However, it is also possible to have a structure in which the means for counting ringing signals utilizes a timer which will activate the device at a predetermined time period after the first ringing signal has been received. Such a structure would be practically equivalent to a counter.

Assuming the device is set to be activated after two rings, when the first ringing portion of the ringing signal arrives, Step 20 will be negative. Next, at Step 21, relay Y-2 is turned on. As stated above, a connection is thus established in which direct current flows from L1 and L2 to photocouplers PC-3 and PC-4. The purpose of establishing the connection is to detect a change in polarity on L1 and L2 of the telephone line which results from a caller's abandonment of call.

At Step 22, a two-second timer (4 second timer in the U.S.) which corresponds to the silent portion of the ringing signal (see t2-t3 of FIG. 3) is started and during that time Y-2 is maintained in the on position.

At Step 23, a test is performed to determine whether FLAG is set to "1." As mentioned earlier, L1 is positive and L2 is negative during standby mode of the present device. Therefore, FLAG is equal to "1" and Step 23 will be positive.

Next, at Step 24 a test is performed to determine whether photocoupler PC-3 is on.

As mentioned above, photocoupler PC-3 is on provided that L1 is positive and L2 is negative. However, as long as the caller does not abandon a call (operations for the case in which the caller abandons a call will be described later), the voltage at L1 will be at a negative level, as indicated by t2-t3 in FIG. 3. Therefore, Step 24 will be negative. The program will continue in a loop between Step 24 and Step 26 for two seconds.

After the two seconds have elapsed, the aforementioned relay Y-2 is turned off at Step 28 and the program returns to Step 17. Then, the second ring arrives (see t3-t4 of FIG. 3). Steps 17 through 19 are as described above. When the counter for ringing signals has reached the predetermined value, Step 20 will be affirmative. Relay Y-1 is turned on at Step 29, whereby the telephone line is engaged (t5 in FIG. 3) and the device is activated.

When the caller places the telephone on hook (t6 in FIG. 3) after the completion of operations of the present device, the on-hook condition will be detected by means of photocouplers PC-1 or PC-2. The program then returns to Step 17, wherein standby mode is restored, via Step 16.

Figure 4:
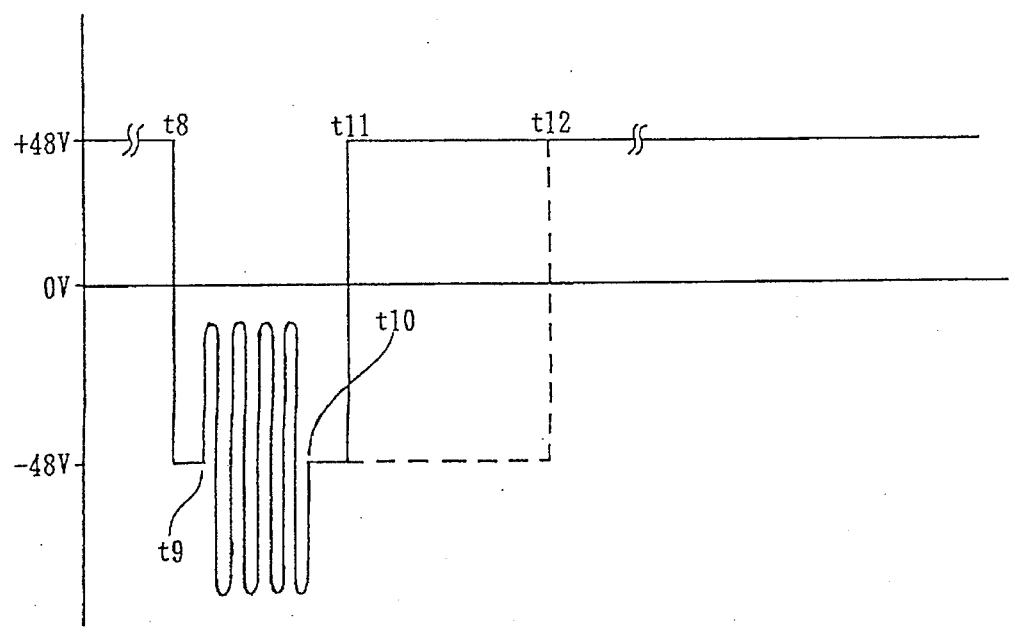
FIG. 4 is a timing chart Illustrating the situation wherein a ringing signal is broken off.

Next, referring to FIG. 4, operations of the present device when a caller abandons a call during ringing will be described.

in the case that a caller abandons a call after one ring has been received on the present device, when the switchboard of the telephone exchange (not shown in the diagram) releases the call at any time during the silent portion from t11 to t12 as shown FIG. 4, voltage at L1 immediately returns to +48 V.

In this situation, photocoupler PC-3 will be turned on. In terms of the flowchart that PC-3 is turned on during the aforementioned loop between Step 24 and 26. Therefore, Step 24 will become affirmative. Next, the program returns to Step 17 via Steps 15 and 16. The device is then restored to standby mode to await the next ringing signal.

As shown above, there is no time delay in restoring the present device to standby mode after a caller abandons a call. Even if a new ringing signal arrives immediately after a previous call was abandoned, the present device will still be activated in response to a predetermined number of rings.

Even if the exchange office terminates the transmission of the ringing signal in the middle of the ringing portion after a caller hangs up during ringing, the present device will be restored to standby mode because L will return to +48 V as shown by t11 of FIG. 4.

The present invention should not be considered to be limited to the aforementioned embodiment. It is possible to obtain various embodiments by employing a number of variations on the same technical concept. For example, a semiconductor switching element can be used instead of relay Y-2. Also, the present invention is applicable not only to telephone answering devices, but also to autodialing equipment or other telephone terminal devices.

As shown above, the present invention is structured so that when a caller hangs up during ringing of the telephone, the resultant change in DC voltage on the telephone line is detected. Unlike conventional devices, the present device is restored to standby mode immediately after a caller hangs up. Even if a ringing signal arrives immediately after a previous caller hung up during ringing of the telephone, the present device will still be activated after a predetermined number of rings. Thus, for example, the toll saver feature which is found in telephone answering devices will operate correctly, which is of great practical importance.

What is claimed is:

1. In a telephone system wherein ringing signals cause a change in a polarity of a telephone line, a telephone terminal device with means for detecting abandonment of a call, said telephone terminal device comprising:

storage means for storing a value indicating polarity of a telephone line prior to reception of a ringing signal on said telephone line;

ringing signal detecting means for detecting ringing signals;

means for activating said telephone terminal device when a predetermined number of said ringing signals are counted;

means for comparing polarity stored in said storage means with polarity of said telephone line during silent portions of said ringing signals or polarity of said telephone line at time of abandonment of said ringing signals, said silent portions and said abandonment occurring prior to activation of said telephone terminal device; and means for restoring said telephone terminal device to standby condition when said compared polarities coincide.

2. In a telephone system wherein ringing signals cause a change in a polarity of a telephone line, a telephone terminal device with means for detecting abandonment of a call, said telephone terminal device comprising:

storage means for storing a value indicating polarity of a telephone line prior to reception of a ringing signal on said telephone line;

ringing signal detecting means for detecting ringing signals;

means for activating said telephone terminal device when a predetermined number of said ringing signals are counted;

means for comparing polarity stored in said storage means with polarity of the telephone line during silent portions of said ringing signals or polarity of the telephone line at the time of abandonment of said ringing signals, said silent portions and said abandonment occurring prior to activation of said telephone terminal device; and means capable of maintaining reception of said ringing signals when said compared polarities do not coincide.

3. In a telephone system wherein ringing signals cause a change in a polarity of a telephone line, apparatus for receiving the ringing signals from the telephone line to activate a telephone terminal device, comprising:

means for detecting a polarity of a voltage supplied by said telephone line before receiving said ringing signals, means for checking the polarity of the voltage supplied by said telephone line after receiving at least one of said ringing signals, means for counting said ringing signals to activate said telephone terminal device when a predetermined number of said ringing signals is received, and means responsive to the polarity detected by said detecting and checking means for controlling said counting means to continue counting said ringing signals when the polarity detected by said checking means does not coincide with the polarity detected by said detecting means, and for resetting said counting means to an initial state when the polarity detected by said checking means coincides with the polarity detected by said detecting means.

4. The apparatus of claim 3, wherein said checking means detect the polarity during a silent period of said ringing signals.

5. The apparatus of claim 3, wherein said counting means are reset when a first sequence of said ringing signals is terminated before said telephone terminal device is activated.

6. The apparatus of claim 5, wherein said telephone terminal device is activated by said counting means when the predetermined number of said ringing signals in a second sequence is received after the first sequence of the ringing signals are terminated.

7. In a telephone system wherein ringing signals cause a change in a polarity of a telephone line, a method of receiving the ringing signals from the telephone line to activate a telephone terminal device comprising the steps of:

detecting a polarity of a voltage supplied by said telephone line before receiving said ringing signals, checking the polarity of the voltage supplied by said telephone line after receiving at least one of said ringing signals, counting said ringing signals in a first sequence of the ringing signals to activate said telephone terminal device when a predetermined number of said ringing signals is received, said step of counting being carried out until the polarity detected after receiving at least one of said ringing signals coincides with the polarity detected before receiving said ringing signals, and thereafter, counting said ringing signals in a second sequence of the ringing signals to activate said telephone terminal device when the predetermined number of said ringing signals in the second sequence of the ringing signals is received.

8. The method of claim 7, wherein said step of checking is carried out during a silent period of said ringing signals.

9. The method of claim 7, wherein said step of counting said ringing signals in the second sequence of the ringing signals is carried out when the first sequence of said ringing signals is terminated before said telephone terminal device is activated.

10. The method of claim 9, wherein said telephone terminal device is activated by the second sequence of said ringing signals when the predetermined number of said ringing signals in said second sequence is received after the first sequence of the ringing signals are terminated.

* * * * *